United States Patent [19]

Taylor

[11] Patent Number: 5,313,590

[45] Date of Patent: May 17, 1994

[54] SYSTEM HAVING FIXEDLY PRIORIZED AND GROUPED BY POSITIONS I/O LINES FOR INTERCONNECTING ROUTER ELEMENTS IN PLURALITY OF STAGES WITHIN PARRALLEL COMPUTER

[75] Inventor: Stuart A. Taylor, Sunnyvale, Calif.

[73] Assignee: MasPar Computer Corporation, Sunnyvale, Calif.

[21] Appl. No.: 461,572

[22] Filed: Jan. 5, 1990

[51] Int. Cl.⁵ .................. G06F 13/00; H04Q 11/04
[52] U.S. Cl. .................. 395/325; 395/200; 379/271; 379/272; 364/DIG. 1; 364/229; 364/284.4
[58] Field of Search .............. 370/65.5, 60, 42, 54, 370/85.6; 340/825; 395/325, 275; 379/16, 271, 272

[56] References Cited

U.S. PATENT DOCUMENTS

| | | | |
|---|---|---|---|
| 4,022,982 | 5/1977 | Hemdal | 370/54 |
| 4,091,455 | 5/1978 | Woods et al. | 395/575 |
| 4,264,895 | 4/1981 | Mukaemachi et al. | 340/166 |
| 4,316,244 | 2/1982 | Grondalski | 395/425 |
| 4,318,185 | 3/1982 | Fiedler . | |
| 4,365,292 | 12/1982 | Barnes et al. | 395/800 |
| 4,439,826 | 3/1984 | Lawrence et al. | 395/575 |
| 4,447,877 | 5/1984 | Grondalski | 395/425 |
| 4,462,073 | 7/1984 | Grondalski | 395/375 |
| 4,627,048 | 12/1986 | Larson | 370/60 |
| 4,651,318 | 3/1987 | Luderer | 370/94 |
| 4,661,947 | 4/1987 | Lea et al. | 370/60 |
| 4,667,320 | 5/1987 | Onno et al. | 370/58 |
| 4,706,240 | 11/1987 | Payne, III | 370/60 |
| 4,771,422 | 9/1988 | Hauer | 370/85 |
| 4,785,446 | 11/1988 | Dias et al. | 370/58 |
| 4,891,802 | 1/1990 | Jasmer et al. | 370/60 |
| 4,965,788 | 10/1990 | Newman | 370/60 |
| 4,993,018 | 2/1991 | Hajikano et al. | 370/60 |

FOREIGN PATENT DOCUMENTS

WO88/06764 9/1988 World Int. Prop. O. .

Primary Examiner—David Y. Eng
Assistant Examiner—Krisna Lim
Attorney, Agent, or Firm—Skjerven, Morrill, MacPherson, Franklin & Friel

[57] ABSTRACT

A network and method for interconnecting a plurality of router elements in a parallel computer. The network forms a routing system for routing data from source processing elements to destination processing elements. The input lines and output lines of each router chip are prioritized. Higher priority output lines from a given output group of a first routing element are connected to low priority input lines of a second routing element and lower priority output lines from the output group of the first rotating element are connected to higher priority input lines of the second routing element.

19 Claims, 13 Drawing Sheets

SYSTEM HAVING FIXEDLY PRIORIZED AND GROUPED BY POSITIONS I/O LINES FOR INTERCONNECTING ROUTER ELEMENTS IN PLURALITY OF STAGES WITHIN PARRALLEL COMPUTER

BACKGROUND OF THE INVENTION

1. Cross-Reference to Related Applications

The following co-pending patent applications are assigned to the same assignee of the present application and are related to the present application: "Router Chip with Quad-Crossbar and Hyperbar Personalities" by John Zapisek (M-867) filed concurrently herewith and assigned Ser. No. 07/926,138 which is a continuation of Ser. No. 07/461,551, now abandoned and "Scalable Inter-Processor And Processor To I/O Messaging System For Parallel Processing Arrays" by John Nickolls et al. (M-881) filed concurrently herewith and assigned Ser. No. 07/461,492, now U.S. Pat. No. 5,280,474, issued on Jan. 18, 1994. The disclosures of these concurrently filed applications are incorporated herein by reference.

2. Field of the Invention

The invention relates generally to parallel data processing systems and more specifically, to a wiring network for interconnecting router chips within a parallel computer system wherein data is routed from source processor elements to destination processor elements.

3. Description of the Relevant Art

Maximizing the data processing speed of computer systems has been a primary goal in the development of computer systems. Extensive effort and resources have been devoted to increasing the speed of conventional, single-processor computer systems which are referred to as Von Neumman machines. Semiconductor processing technology has continuously improved to the point where current microprocessors are approaching theoretical limits in density of features and circuit speed.

As an alternative to conventional, single-processor computer systems, parallel computer systems having multiple processors which simultaneously process data have been proposed. These parallel computer systems comprise several processors or "processor elements" which receive and process data simultaneously. A so-called "massively parallel" computer system may have 1,000 processor elements or more operating simultaneously, and the amount of data which can be processed during a single instruction cycle can be made many times greater than the amount which can be processed by a single-processor computer system.

A problem common to parallel computer systems has involved the development of a communication scheme which allows data to be quickly transferred between processor elements. Data routing circuitry has been designed for routing data from a selected source processor element to a selected destination processor element. Basic parts of the data routing circuitry of a parallel computer system may be manufactured on a single integrated circuit chip called a router chip. A typical router chip has a multiplicity of input terminals, each of which is connected to a route granting device and also a multiplicity of output terminals, each of which is connected to a destination device.

When a large number of processing elements (i.e. more than 1000) are to be interconnected within a parallel computer system, it becomes impractical or impossible to provide the circuitry for an entire routing system on one integrated circuit chip. Consequently, the circuit is partitioned and several router chips or elements are implemented in stages to provide a communications path between a message-originating processor element and a message-receiving processor element.

The stages of router elements are preferably interconnected by a wiring network which allows any processor element to communicate with any other processor element within the parallel computer. DEC (Digital Equipment Corp. of Massachusetts) has developed a multistage crossbar type of network for allowing clusters of processor units to randomly communicate with other clusters of processor units. The DEC crossbar system is described in PCT application WO 88/06764 of Grondalski which was published Sep. 7, 1987 and is based on U.S. patent application Ser. No. 07/018,937, now abandoned. The disclosures of the Grondalski applications are incorporated herein by reference.

Ideally, messaging should occur in parallel so that multiple processor elements are exchanging information simultaneously. If, however, sets of data from more than one processor element (PE) are directed to the same input wire or bus of a destination processor element during one data transfer cycle, contention occurs. The data from one of the message-sending processor elements is blocked and must be retransmitted after the completion of transmission of the data set from the other message-sending processor element. In addition to this contention mechanism, there are a limited number of wires within the routing network. If the number of processing elements wishing to send messages is more than the number of router wires, the transmission of data from one processor element may have to be delayed while the transmission of data from another processor element passes through a choke point even though the data sets are being routed to different destination processing elements. This is known as internal channel "blockage" or internal contention. When channel contention occurs, the data set from one of the processing elements can not transfer to the destination processing element until after the data from the contending processing element passes through. Channel contention is undesirable because it increases messaging time for the system as a whole.

SUMMARY OF THE INVENTION

It is an object of the invention to provide a network and method for interconnecting a plurality of router elements which form a routing system within a parallel computer in a manner which on average reduces the occurrence of internal blockage or contention for random communication patterns. A method for finding an optimal interconnecting wiring pattern to effectively reduce internal blockage is further provided.

According to the invention, a multi-stage routing network includes a plurality of router elements, each of the router elements having a plurality of input lines and a plurality of output wire groups. Each of the output wire groups (WG's) has a plurality of output lines to which data may be coupled from any one of the input lines. The connection of input lines to the output lines of each of the router elements occurs according to a daisy-chained, "first come, first served" basis. Physical positioning within the daisy chain inherently gives some input lines a higher "priority" than others when connection requests are serviced. Accordingly, connections or routing requests are prioritized such that a first set of data arriving on a high priority input line which requests connection to a selected output wire (WG) group is serviced first and connected to what will be called a high priority output line of the selected output wire group. A second set of data arriving on a lower priority input line and also requesting connection to the selected output wire group is serviced afterwards and thereby assigned to what can be called a lower priority output line of the selected output wire group.

An inter-stage wiring network according the invention comprises a first connecting means which couples to a first output line of a first router element to a first input line of a second router element, and a second connecting means which couples a second output line of the first router element to a second input line of the second router element. The first output line and the second output line are included within a first output wire group of the first router element. A "twist" is provided in the wiring of the first router element to the second router element such that the first output line of the first router element has a higher priority than its second output line but the first input line of the second router element has a lower priority than its second input line.

The wiring pattern which forms the interconnecting network of the routing system is arranged such that the unfair advantage or handicap given to messages because of their physical or logical positioning within the route-request servicing mechanism of the individual router chip prioritization on the overall routing system is largely nullified. When an interconnecting network in accordance with the invention is implemented in a routing system of a parallel computer, less disparity between the time at which one input line delivers messages in comparison to another input line occurs for random communication or transfer patterns. The overall network utilization is kept high for a relatively longer period, and messages originating at certain input lines are not given a handicap over messages originating at other input lines. The overall time to deliver all of the messages is reduced.

As will be appreciated by one skilled in the art, the invention is applicable to parallel computer systems having a multi-stage routing network, and is not limited to the system disclosed in the preferred embodiment.

DETAILED DESCRIPTION

Figure 1:
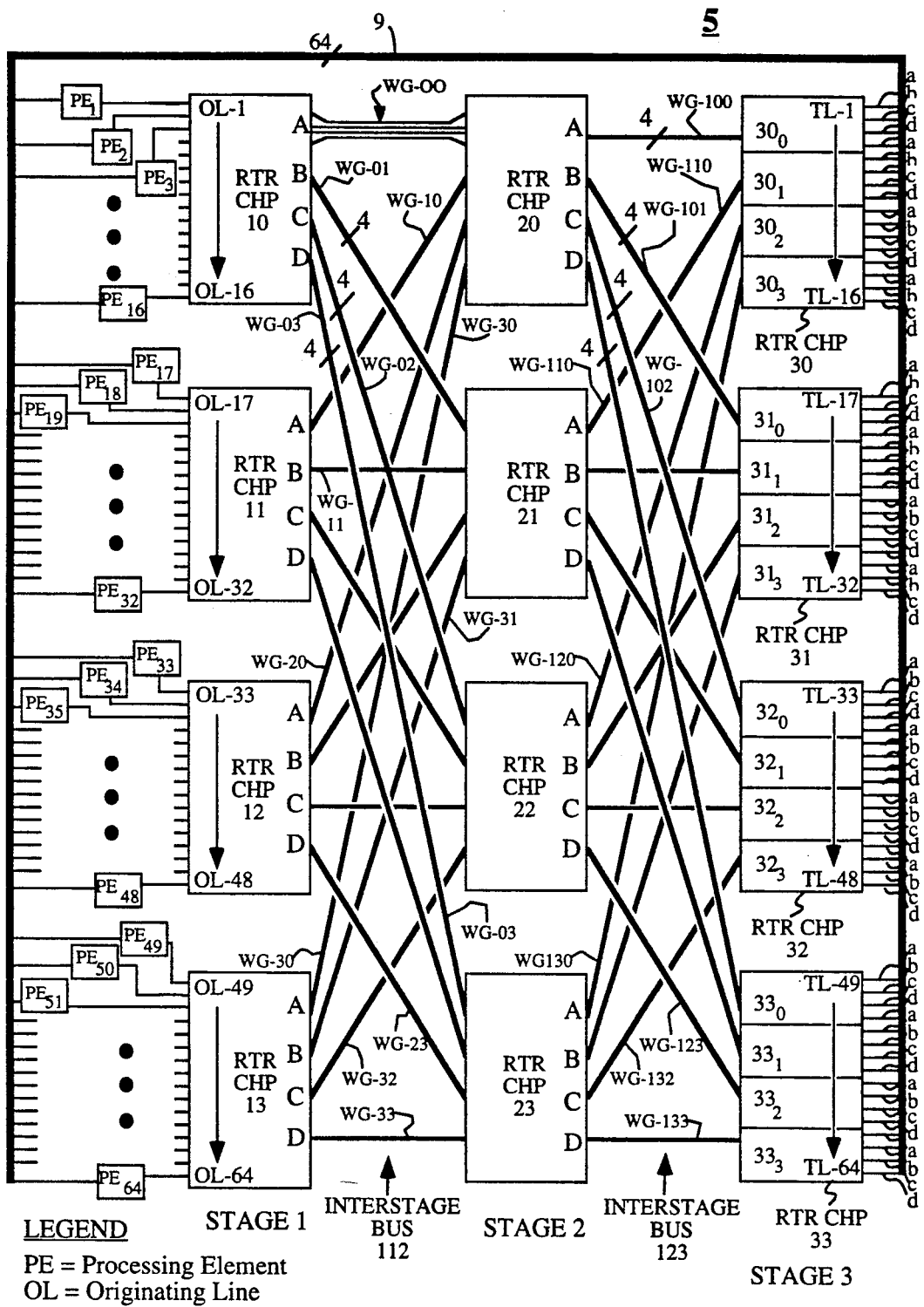
FIG. 1 shows a block diagram of a routing system for a parallel computer.

Referring to FIG. 1, a block diagram of a routing system 5 for a parallel computer is shown. Routing system 5 has a total of sixty-four message originating lines (OL-1 through OL-64) and sixty-four message target lines (TL-1 through TL-64). Each message originating line OL-x is connected to a separate one, $PE_x$, of processing elements $PE_1$–$PE_{64}$. Each message target line TL-y is returned to a corresponding one $PE_y$ of the processing elements $PE_1$–$PE_{64}$ along a sixty-four wire bus 9 (x and y being arbitrary identifiers here).

Routing system 5 provides a plurality of m electrical paths through which data from an originating set of the processing elements $PE_1$–$PE_{64}$ connected to one or more of the sixty-four originating lines OL-1 through OL-64 may be transferred to any target set of the processing elements $PE_1$–$PE_{64}$. The processing element from which a route request is initiated is known as the message originating processing element $PE_O$ and the processing element to which data is initially directed is known as the message target processing element $PE_T$.

Stage 1 of routing system 5 includes router elements or chips 10–13 and Stage 2 includes router elements or chips 20–23. Each of the router elements 10–13 and 20–23 has sixteen input lines and four output wire groups. Each output wire group consists of four output lines (not shown all individually in FIG. 1). Thus, there are a total of sixteen output lines on each of router elements 10–13 and 20–23. Each message originating processing element $PE_0$ and its corresponding message originating line is connected to a separate input line of router elements 10–13.

The router elements 10–13 and 20–23 operate identically. Data on any of the sixteen input lines of router element 10 may be directed to any of its four corresponding output wire groups (A–D). Similarly, data on any of the input lines of router element 11 may be directed to any of its four corresponding output wire groups (A–D). The routing scheme utilized in stages 1 and 2 is known as a hyper-bar network. Data may be directed from any input line to a specific one of the output wire groups A–D, but data cannot be directed to a specific output line within the selected output wire group.

Stage 3 of routing system 5 includes output router elements 30–33. Each of the output router elements 30–33 has four sections, each section having four input lines (not shown individually) and four output lines A, B, C, and D. Each of the output lines is connected to a separate message target line. Data on any input line of a given section may be directed to any output line A-D within the same section. The routing scheme utilized in each section of stage 3 is known as a crossbar network.

A set of data is routed through routing system 5 according to a serial chain of address bits which precedes the set of data called a route request head. In this example, each route request head is a serial chain of six bits. Each router element 10-13, 20-23, and 30-33 has a route granting circuit which is responsive to addressing bits of the route request head at each input line and which opens channels, or makes connections, from the input lines to an output line in accordance with the route request head. In stages one and two, each router element "retires" two address bits when the data set is routed from a particular input line to one of four output groups (A-D) going to the next stage. Stage three is different in that each router element is actually four smaller, independent sections, each of which retires the last two address bits of the route request head by connecting the input line on which the remaining addressing bits appear to one of four output lines in the same section.

Figure 1A:
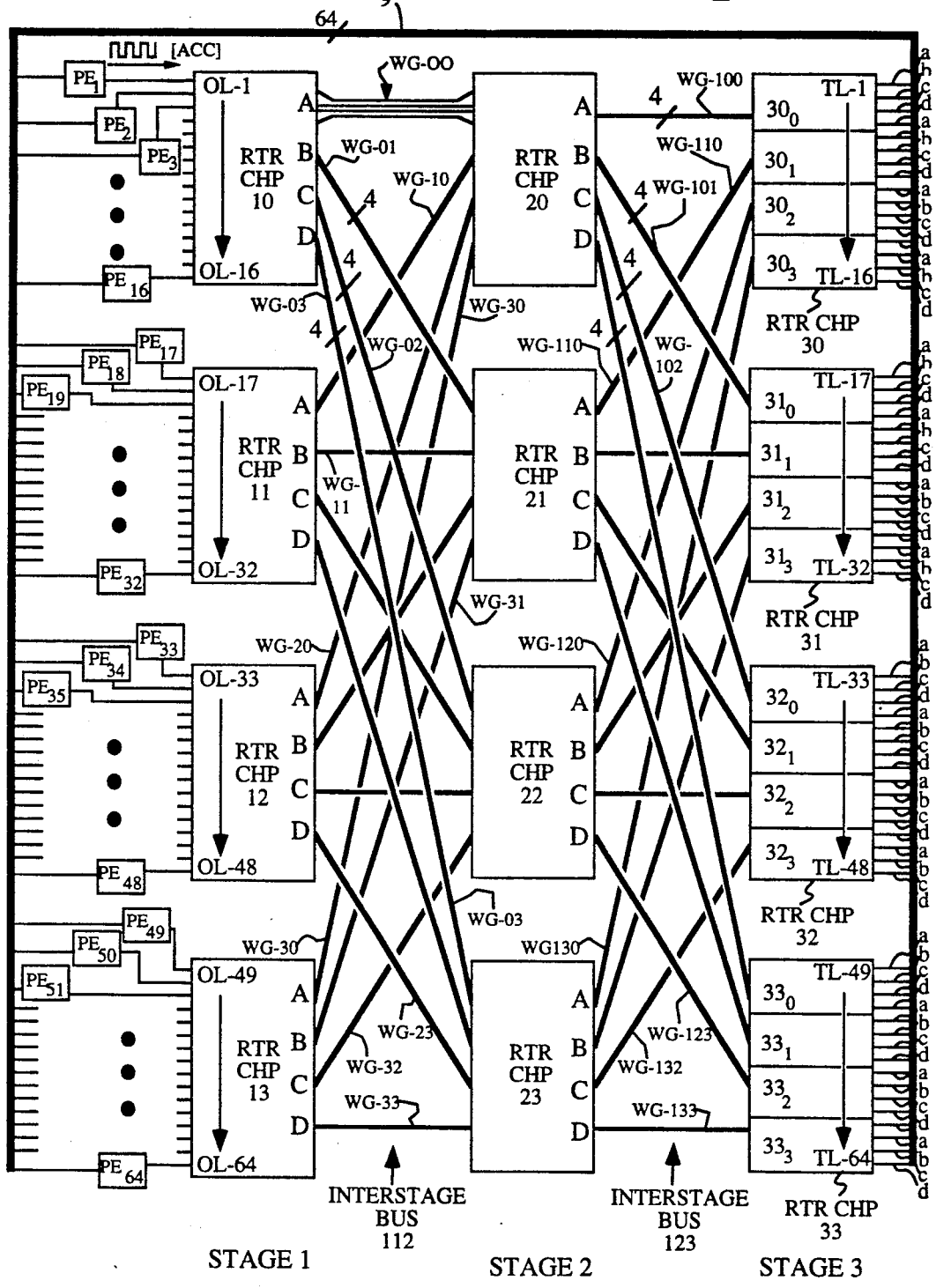
FIG. 1A illustrates an example of a route request through the routing system.

As an example, suppose a programmer desires that data held by processing element one ($PE_1$) be transferred to processing element thirty-five ($PE_{35}$) Referring to FIG. 1A, the programmer must provide the proper route request head to processing element $PE_1$ which will cause the route granting circuitry to open a complete routing channel from $PE_1$ to $PE_{35}$. This route request head corresponds to a route request sequence "ACC". When execution of the data transfer is desired, the route request head is provided serially to message originating line OL-1 from $PE_1$. The first two addressing bits cause a channel to open through to output wire group A of router element 10. The first two addressing bits are "retired" or consumed by this operation. The remainder of the addressing bits pass through the opened channel in router element 10 and through a wire in wire group WG-00 and are received by an input line to router element 20. The next two addressing bits cause another channel to open through to output wire group C of router element 20. The remaining two addressing bits are passed through router element 20 and through a wire in wire group WG-102 to subsection $32_o$ of router element 32 and cause a channel to open through output line C of subsection $32_o$ to message target line TL-35 which connects to processing element $PE_{35}$. Thus, a channel is opened between $PE_1$ and $PE_{35}$, and the desired data transfer from $PE_1$ to $PE_{35}$ may be executed. Furthermore, after the channel has been opened between $PE_1$ and $PE_{35}$, data may be transferred from processing element $PE_{35}$ to processing element $PE_1$.

The characteristics of the individual router elements 10-13 and 20-23 in the first two stages is significant with respect to the invention. Due to the route granting circuitry, the input lines and output lines of each router element (10-13 and 20-23) are such that a first set of data on a high priority input line which is directed to a selected output wire group is provided to a high priority output line of the selected output wire group. A second set of data on a lower priority input line which is also directed to the selected output wire group is provided to a lower priority output line of the selected output wire group. Furthermore, when data sets on more than four input lines of a given router element are directed to the same output wire group, only the data sets on the four input lines having highest priority will be transmitted to the output wire group. The data sets residing on the lower priority input lines must wait for the higher priority input lines to transfer data. Thus, when there is contention for connections, addressing bits on certain input lines are more likely to open the desired channel without delay to allow data transfers on those input lines, and, in addition, certain output lines of an output wire group are more likely to receive data sets than other output lines within the same output wire group.

Figure 2A:
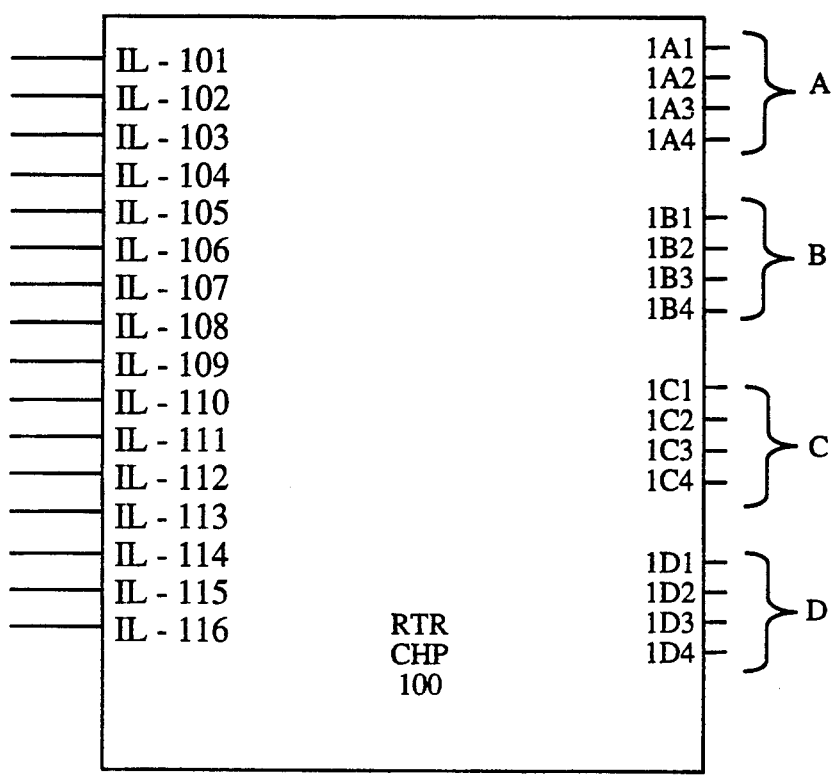
FIG. 2A shows a diagram of an individual hyper-bar router element contained on an integrated circuit chip.

This router element prioritization may be better understood by referring to FIG. 2A which shows a router chip or element 100 having the same characteristics as each of router elements 10-13 and 20-23. The input lines of router element 100 are numbered 101-116. The output lines are designated 1A1-1A4, 1B1-1B4, 1C1-1C4, and 1D1-1D4. The output wire groups are lettered A-D. A data set on any of input lines 101-116 may be transferred to output wire group A, B, C or D depending upon the addressing bits of the route request head which precede the data set. When a route granting circuit within router element 100 receives the addressing bits, it opens a channel from the input line where the route request head was received to the addressed output wire group provided the output wire group has a "not busy" line within it. Since there are four possible output wire groups, two addressing bits are required for routing the data set through router element 100. For example, addressing bits having a binary value 00 may correspond to output wire group A, binary 01 to output wire group B, binary 10 to output wire group C, and binary 11 to output wire group D. Thus, if the addressing bits received from an input line are binary 00, a channel is opened from the input line to output wire group A provided that there is an available output line within output wire group A. Similarly, if the addressing bits are binary 10, a channel may be opened to output wire group C if there is an available output line within output wire group C.

Both the input lines 101-116 and the output lines 1A1-1A4, 1B1-1B4, 1C1-1C4, and 1D1-1D4 of router element 100 can be said to be "prioritized" such that a lower numbered input or output line has a higher priority over a corresponding higher numbered input or output line. This prioritization is a consequence of the route granting circuitry within the router element. If a data set on input line 101 and a data set on input line 102 are directed to output wire group B (in accordance with their addressing bits), then the data set on input line 101 is routed to the higher priority output line 1B1. The data set on input line 102 is routed to output line 1B2 which has a lower priority than output line 1B1. Similarly, if during the same transfer cycle, addressing bits on input lines 108, 112, and 116 also request a line in output wire group B, a channel from input line 108 is opened to output line 1B3 and a channel from input line 112 is opened to the output line 1B4. However, the request of input line 116 is not granted since there are no more available output lines within output wire group B. Thus, the addressing bits on input line 116 (which has a lower priority than the input lines 101, 102, 108 and 112) can not open a channel to an output line within output wire group B until a later transfer cycle when an output line is available. Hence, during any given transfer cycle, a data set from a higher priority input line (which corresponds to the lower numbered pins of router chip 100) is always provided to a higher priority output line within an output wire group in comparison to a data set from a lower priority input line which is directed to the same output wire group. Data sets on input lines 101, 102, 103, and 104 are always transferred during a given transfer cycle, whereas data sets on input lines 105–116 (having lower relative priority) will be transferred to an output wire group during a given transfer cycle only if less than four other input lines having higher priority request a channel to the same output wire group. Thus, a message coming in on input line 116 has an inherent disadvantage in gaining access to an output wire group as compared to each of the other, lower-numbered input lines.

Figure 2B:
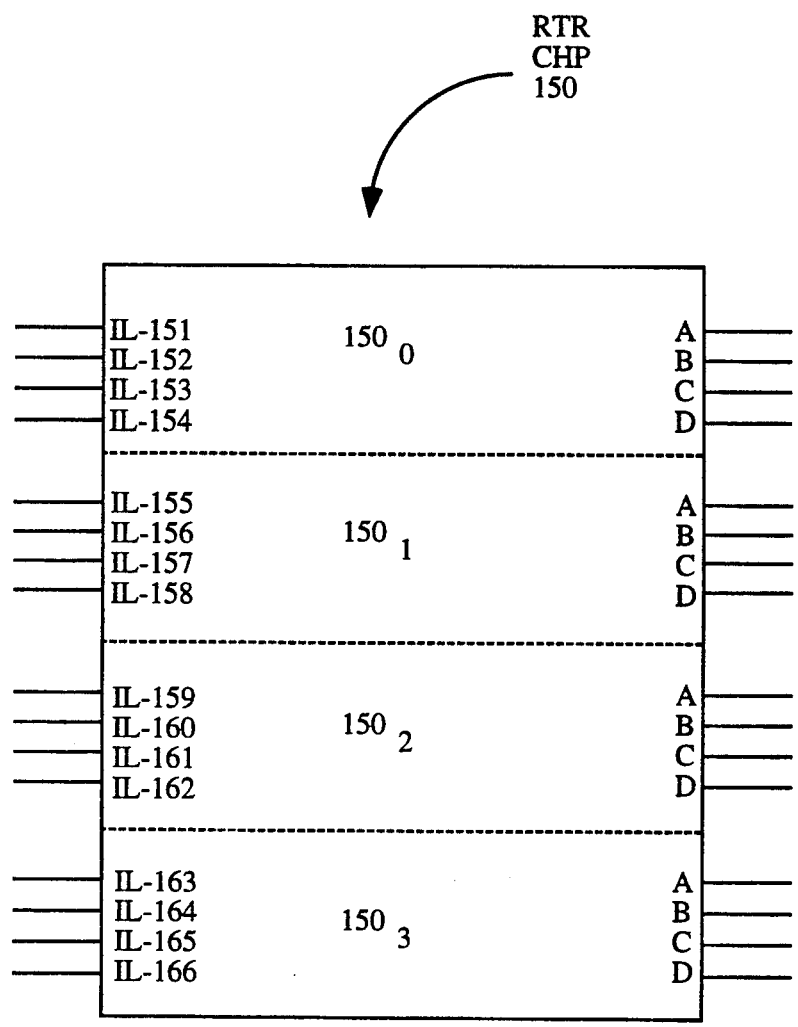
FIG. 2B shows a diagram of an individual crossbar router element contained on an integrated circuit chip.

The router elements 30–33 of routing system 5 have the same characteristics as router element 150 shown in FIG. 2B. Router element 150 has subsections $150_0$, $150_1$, $150_2$, and $150_3$ which each operate independently. Each subsection has four input lines (numbered from 151–166) and four output lines (A–D). Addressing bits arriving at any input line may cause a channel to open from the input line to any output line A–D within the same subsection. For example, if addressing bits arriving at input line 161 of subsection $150_2$ are binary 01 corresponding to output line B, a channel may be opened from input line 161 to output line B of subsection $150_2$.

Figure 3:
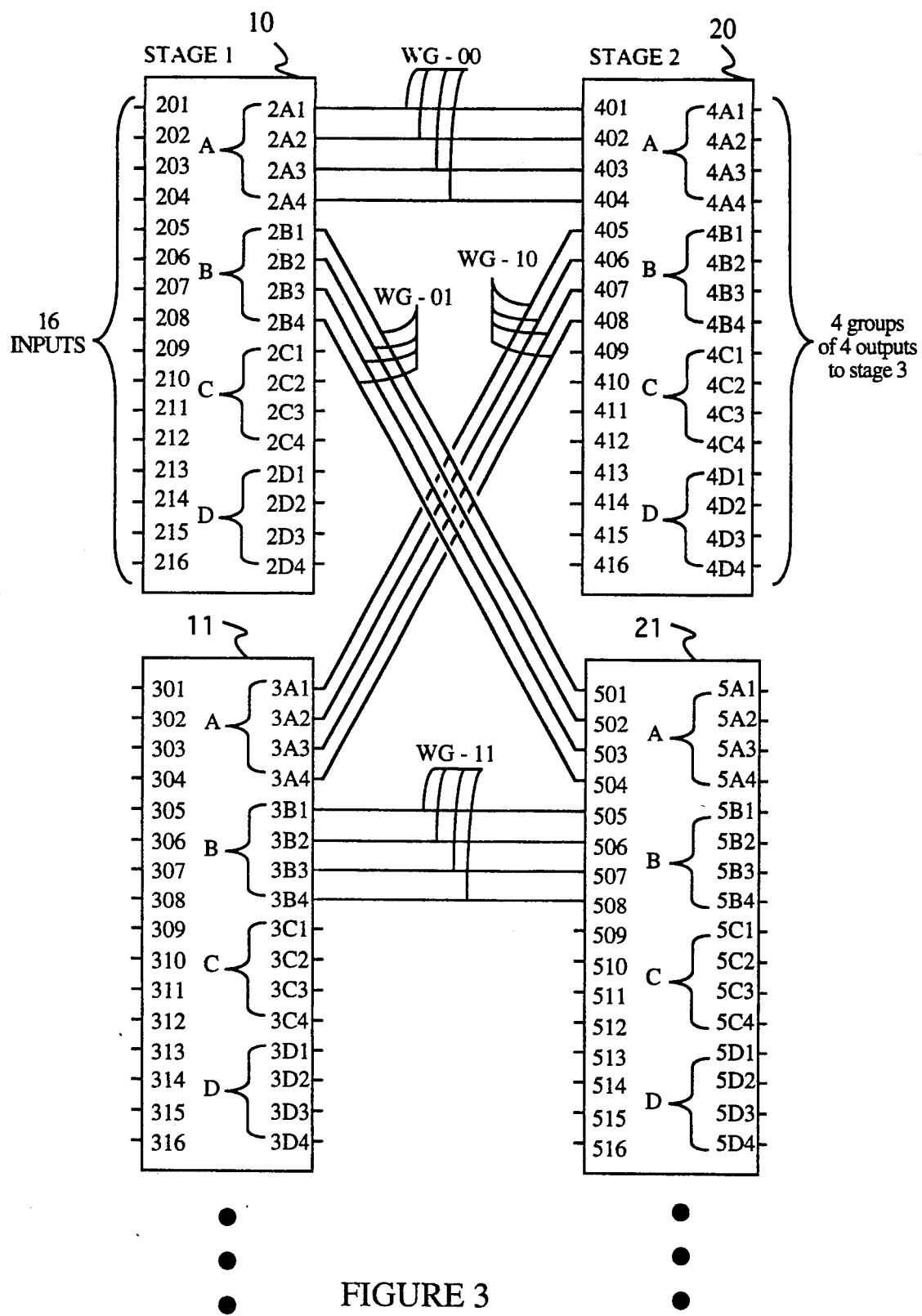
FIG. 3 shows a wiring scheme for interconnecting stages of a router system for a parallel computer.

FIG. 3 shows a wiring network for interconnecting a section of stages 1 and 2 of routing system 5 having the gross wiring pattern of FIG. 1; that is, the output wire groups (WG) from each router element 10 and 11 are connected to the same stage 2 router elements as in FIG. 1. Straight-line connections between router elements 10, 11, 20 and 21 are shown in FIG. 3, and connections that would lead to other router elements of routing system 5 of FIG. 1 are not shown. The interconnecting network of FIG. 3 may appear to be a direct approach to interconnecting routing system 5. The output lines from a given output wire group A–D of a stage 1 router element 10 or 11 are connected in an ordered sequence to input lines of a stage 2 router element 20 or 21. In other words, lower numbered output lines in a given output wire group are connected to lower numbered input lines. It may be assumed that router elements 12, 13, 22, and 23 of FIG. 1 are similarly interconnected.

As a consequence of the interconnecting network of FIG. 3, higher priority output lines of stage 1 router elements 10 and 11 are connected to higher priority input lines of stage 2 router elements 20 and 21. Thus, data sets on input lines 201–204 of router element 10 are always allowed a channel to the output of stage 2 during successive transfer cycles, while data sets residing on other input lines (205–316) are less likely to be transferred without delay.

For example, a number of messages, or sets of data, may be queued at each processing element connected to each input line (201–216 and 301–316) of both router elements 10 and 11. With input lines prioritized as described above, a message coming in at input line 201 of router element 10 and having addressing bits requesting a selected output wire group of router element 10 is guaranteed to open a channel through stage 1 to either output line 2A1, 2B1, 2C1, or 2D1, depending upon the designated output group as determined by the first two addressing bits. The remaining addressing bits are then received by a high priority input line of a stage 2 router element where the message is guaranteed to open a channel and pass through to stage 3 without delay.

In contrast, a message entering on input line 316 of router chip 11 may be routed through stage 1 only if less than four other input lines of router chip 11 have messages addressed to the same output wire group. If input line 316 is allowed a channel through router chip 11, then a channel through stage 2 will be provided and the message will be passed to stage 3 only if less than four other lines coming from router chips 10 or 11 request the same output wire group in stage 2. Of the thirty-two input lines to router chips 10 and 11, data sets on input lines 201–204 of router chip 11 are most likely to be transferred to stage 3, and a data set on input line 316 of router chip 11 is the least likely of any to get through.

Figure 4A:
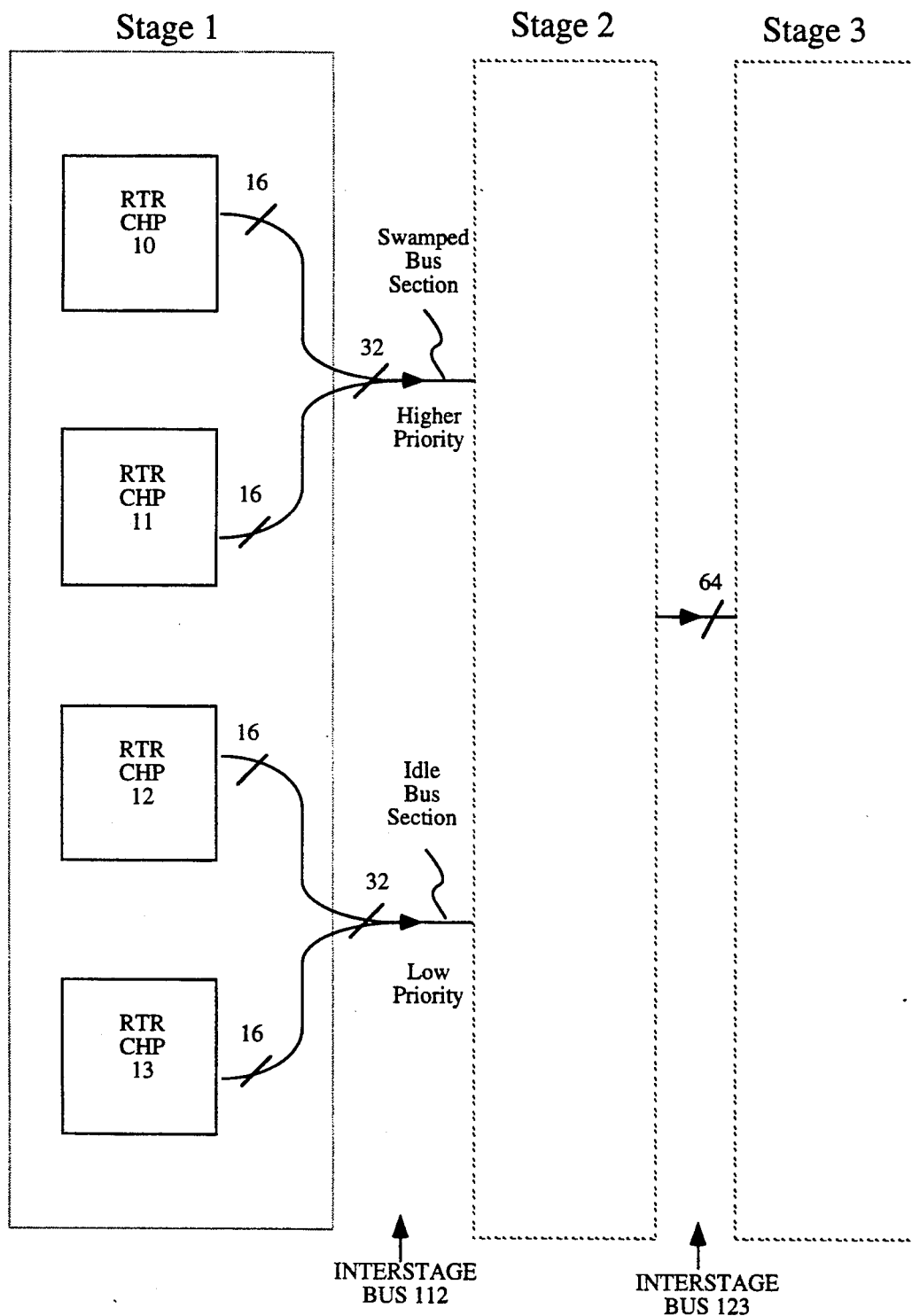
FIG. 4A shows a block diagram of the routing system wherein several messages are queued t each message originating line and illustrates that a bus of output lines from higher priority router elements is swamped, while a bus of output lines from lower priority router elements is idle.

When the interconnecting network between stages 1 and 2 of the routing system 5 of FIG. 1 is wired as shown in FIG. 3, and when a number of random addressed messages are queued at the processing element of each message originating line OL-1 through OL-64, inefficient utilization of the system occurs. As shown in FIG. 4A, at first when all the processing elements have messages queued, the interstage bus section connecting router elements 10 and 11 to stage 2 is continuously occupied transferring messages or "swamped," while the bus connecting router elements 12 and 13 to stage 2 is idle, delivering relatively fewer messages. The imbalance between the utilization of the interstage bus sections is a result of the prioritization which message originating lines OL-1 through OL-32 have over the lower priority message originating lines OL-33 through OL-64.

Figure 4B:
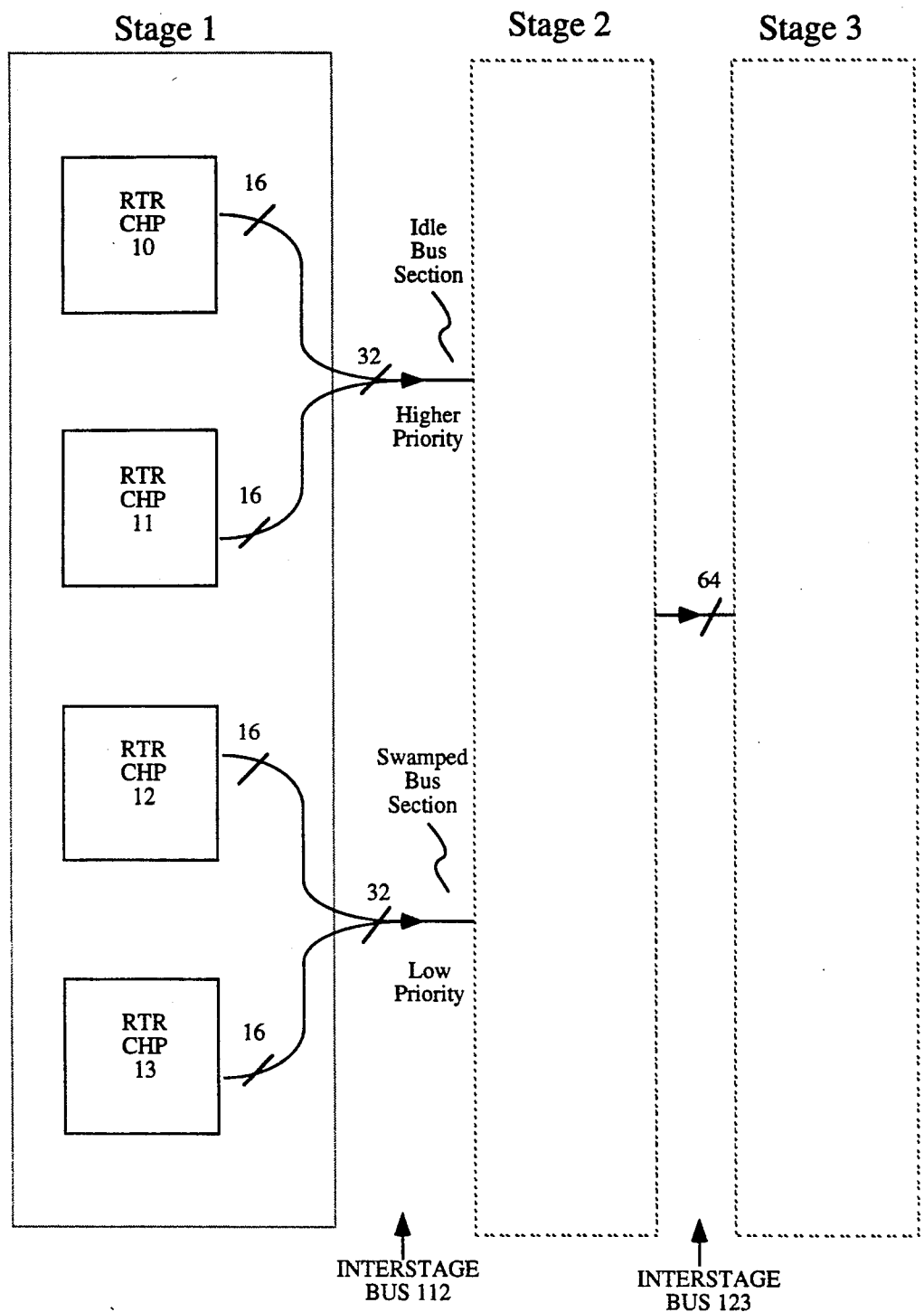
FIG. 4B shows a block diagram of the routing system wherein message are primarily queued at message originating lines having lower priority and illustrates that a bus of output lines from the higher priority router elements is idle, while a bus of output lines from the lower priority router elements is swamped.

After the processing elements $PE_1$–$PE_{32}$ connected to input lines of router elements 10 and 11 have delivered all or most of their queued messages, output lines from stage 2 are freed to allow processing elements $PE_{33}$–$PE_{64}$ to deliver their corresponding messages. As shown in FIG. 4B, during this time, the interstage bus section connecting router elements 12 and 13 to stage 2 becomes swamped and the bus connecting router elements 10 and 11 to stage 2 becomes idle.

Hence, portions of the routing system 10 are idle while other portions are swamped with messages transferring from a message originating processing element to a message target processing element. Initially, when several messages are queued at each of the processing elements, messages from processing elements connected to message originating lines having relatively highest priority (i.e. OL-1 to OL-5) are delivered without delay while messages from processing elements connected to message originating lines having relatively lowest priority (i.e. IL-60 to IL-64) are typically delayed since many channels are already occupied by the higher priority originating lines. Messages queued at the higher priority originating lines are consequently delivered before the messages queued at the lower priority originating lines. Messages queued at the lower priority originating lines are typically last in completing transmission of messages. This results in inefficient router system utilization of the interstage bus 123 since many channels between stages 2 and 3 are available to transmit data but are not used since isolated sections of interstage bus 112 are idle and are not delivering messages. Furthermore, in general or on average, different processing elements should take approximately the same amount of time to deliver messages.

Extending this observation to a larger router system, it is quite possible that all of the messages coming into the highest priority input lines will be delivered before any of the messages from the lowest priority input lines are delivered. After most messages have been delivered, some message originating processing elements will still have quite a few messages queued while others have none. The effect is that most of the router system is idle while only a few processing elements are delivering messages.

In accordance with the present invention, a network for interconnecting stages of a router system effectively reduces internal blockage or contention for random or irregular communication patterns. The term "internal blockage" refers to the blockage within the router which does not occur in a true crossbar switch. Specifically, it is the blockage that occurs in stages other than the last stage. The internal blockage is effectively reduced since the effect of the individual router chip prioritization on the overall routing system is largely nullified.

The amount of internal blockage in the router is dependent upon a number of factors. These factors include the size and behavior of each router chip or elements within the routing system, the wiring pattern between the elements, and the actual communications pattern. Normally, the router will be designed such that the most common communication pattern will have little or no blockage. Other patterns, including random patterns, will exhibit varying amounts of blockage.

Figure 5:
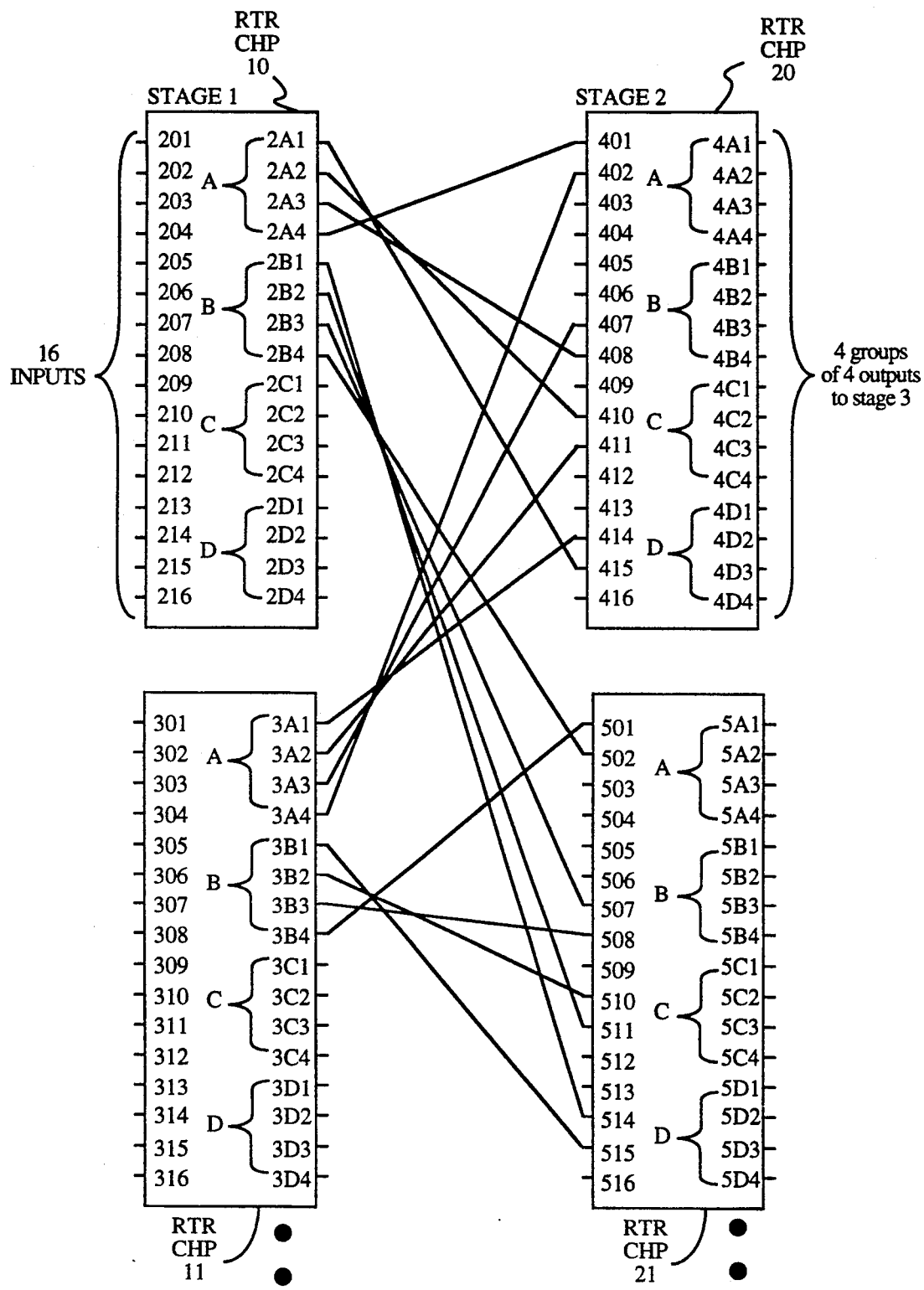
FIG. 5 shows a wiring scheme in accordance with the present invention which interconnects the stages of a router system for a parallel computer.

FIG. 5 illustrates a network for interconnecting router chips according to the present invention. FIG. 5 is similar to FIG. 3; however the interconnecting wires are permuted. It should be noted that this wiring variant has the "gross" wiring pattern as shown in FIG. 1; that is, the output wire groups from each router elements 10 and 11 are connected to the same stage 2 router element as in FIG. 1.

In the wiring network of FIG. 5, the relatively high priority stage 1 output lines are primarily connected to the relatively low priority input lines to stage 2. Conversely, lower priority stage 1 output lines feed to higher priority stage 2 input lines. The "twist" in the wiring pattern largely nullifies the priority advantage that some input messages had over others. Although interconnections to routing elements 12, 13, 22, and 23 are not shown, it may be assumed that the wiring pattern between stages 1 and 2 is similar throughout.

The effect upon overall routing efficiency is significant. With a random communication pattern, there is much less disparity between how quickly one input line delivers messages compared to another. All of the input queues empty at nearer to the same time, the network utilization is kept high for a relatively longer period, and the tail during which only a few input lines are delivering messages is much shorter. The total time to deliver all the messages is reduced.

Figure 6:
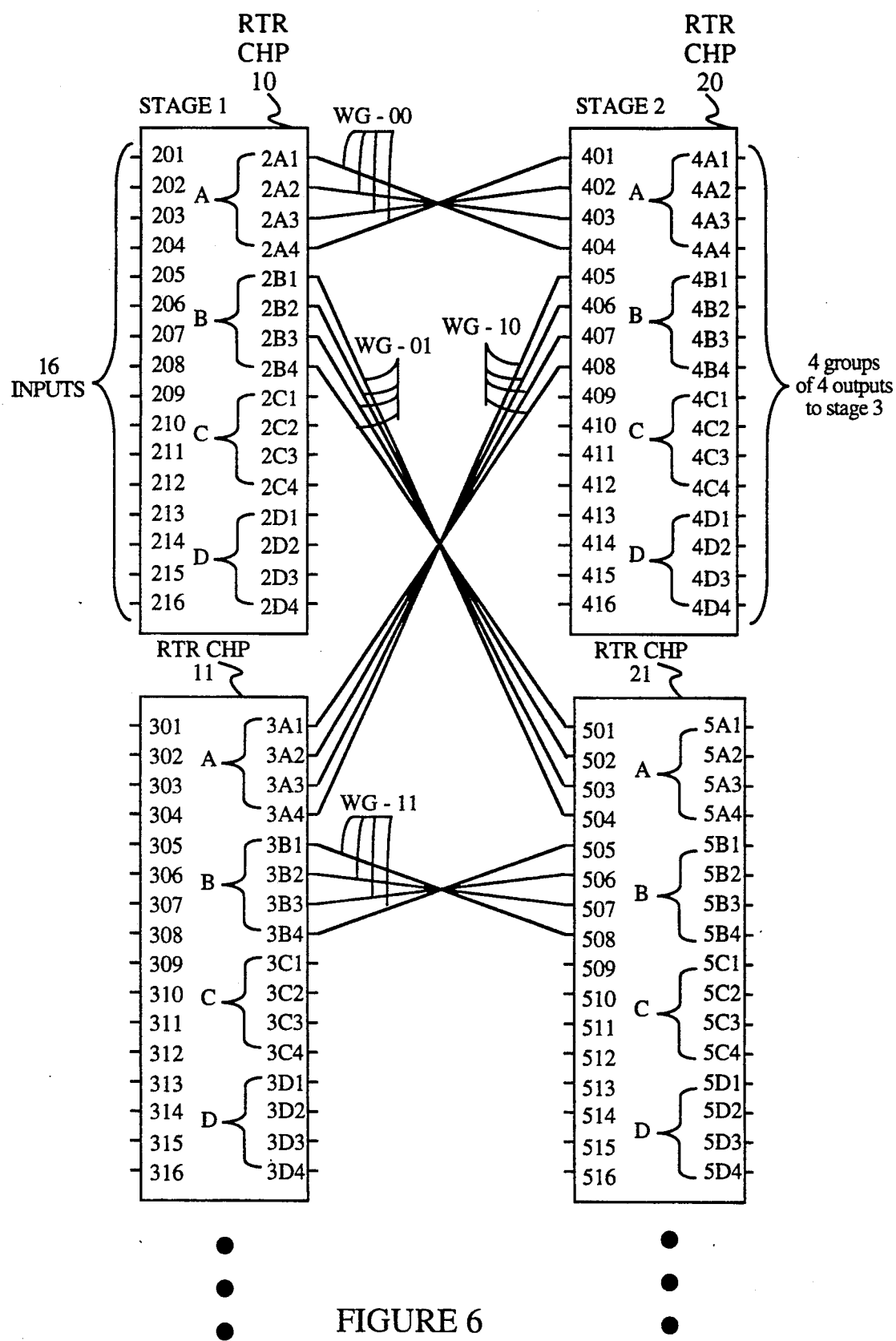
FIG. 6 shows a "twist" in the wiring pattern of FIG. 3.

FIG. 6 shows a "twist" in the wiring pattern of FIG. 3 which is incorporated in the interconnecting network of FIG. 5. The "twist" in the wiring allows high priority output lines in an output wire group to connect to lower priority input lines in comparison to lower priority output lines in the same output wire group.

Figure 7:
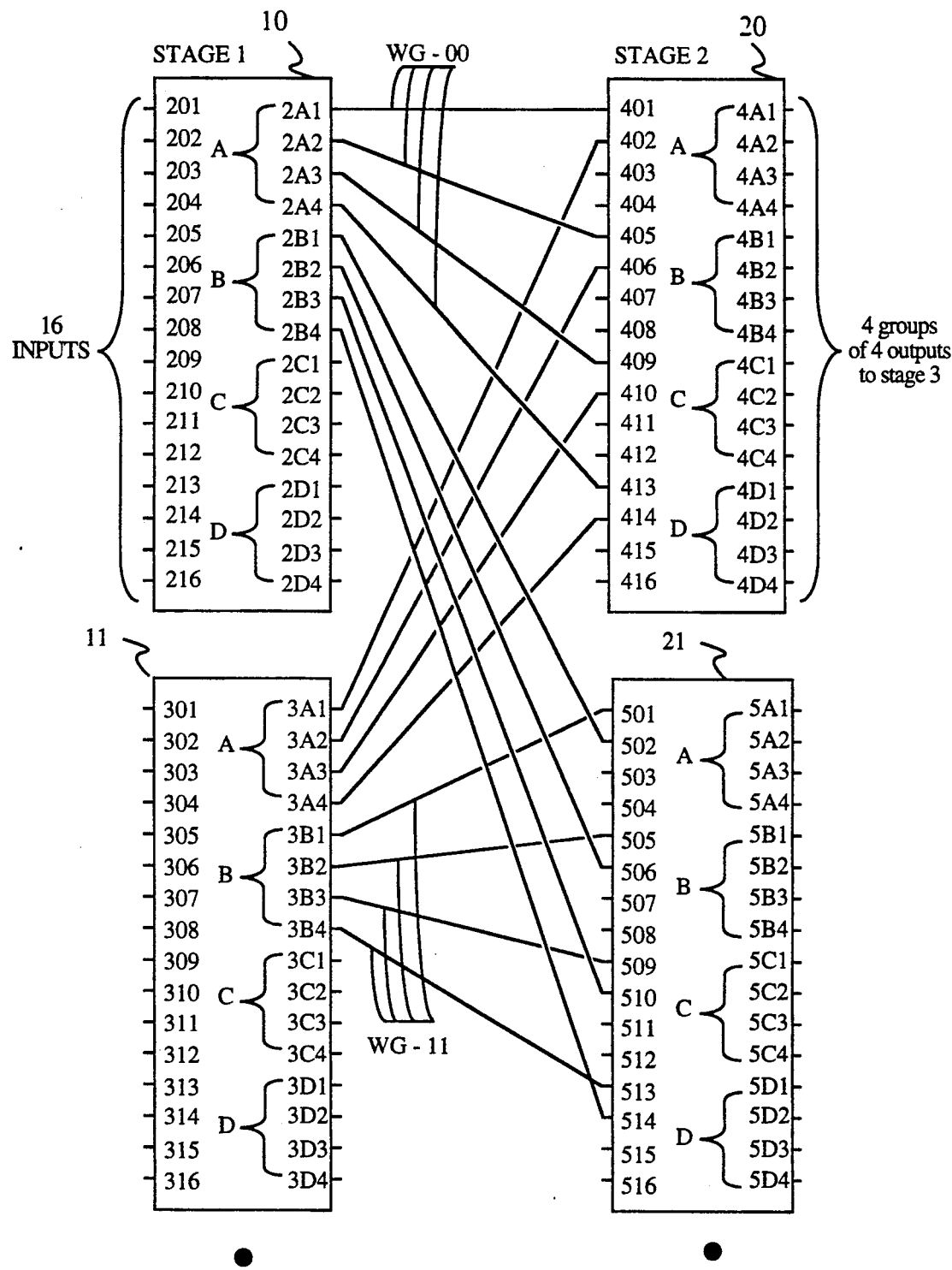
FIG. 7 shows a "splay" in the wiring pattern of FIG. 3.

FIG. 7 shows a "splay" in the wiring pattern of FIG. 3 which is incorporated in the interconnecting network of FIG. 5. The "splay" spreads out the output lines of each output wire group such that they are not connected to input lines of Stage 2 having consecutive relative priority. The wires from each output wire group are connected to input lines equally spaced apart.

Figure 8:
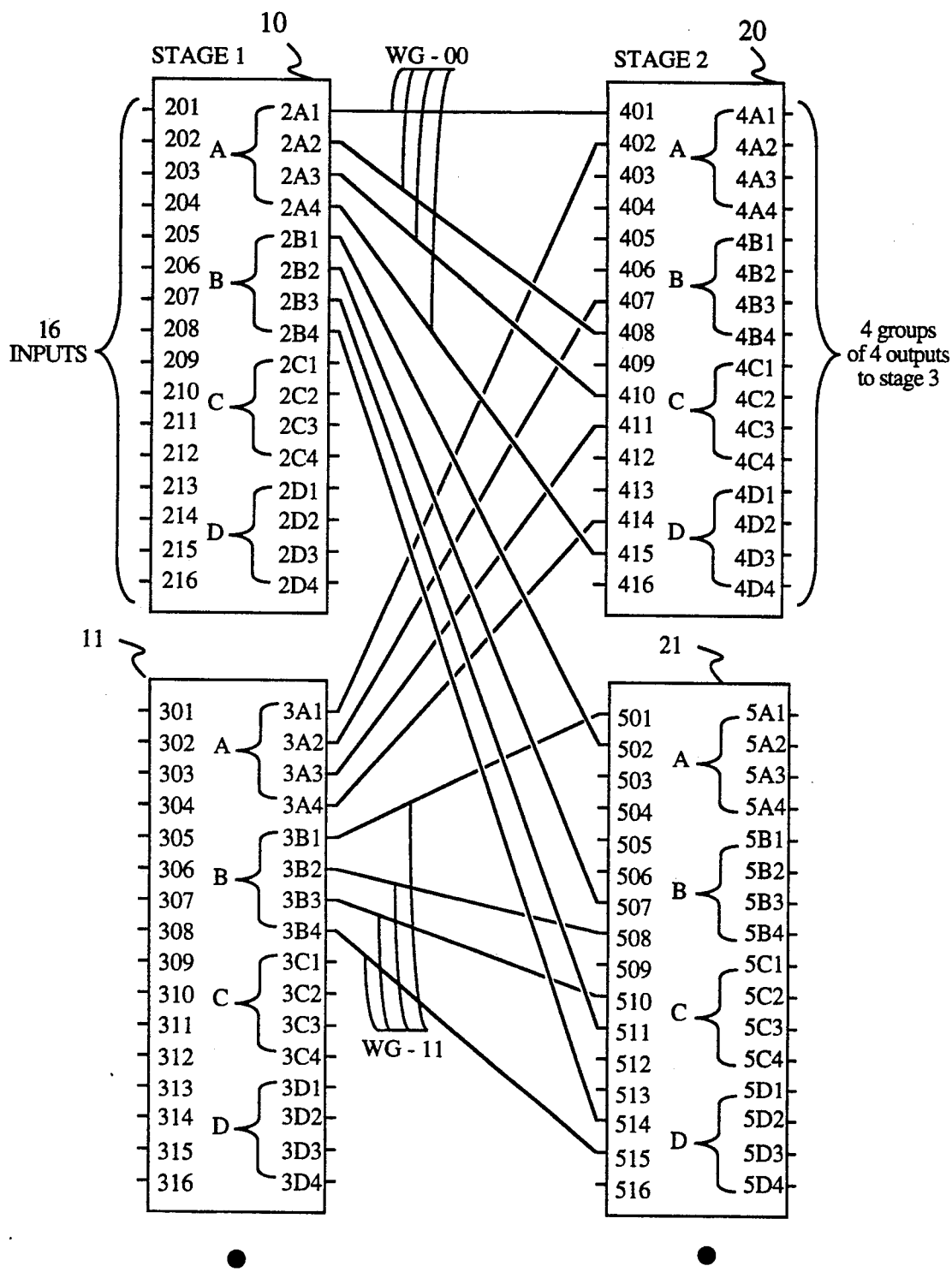
FIG. 8 shows a "splay" and a "tweak" in the wiring pattern of FIG. 3.

FIG. 8 shows a "tweak" in the splayed interconnecting pattern of FIG. 7. A tweak separates wires of a splayed output wire group such that the wires are not connected to equally spaced input lines of a stage 2 router element. For example, the wires connected to input line 501 and input line 508 are separated by six other input lines (502–507), while the wires connected to input line 508 and input line 510 from the same output wire group are separated by only one input line (509). The tweak averages the priority of the output wire groups such that output wire groups from different router elements have nearer to the same averaged priority.

The "twist", "splay", and "tweak" may be incorporated in a large-scale routing system having a greater number of message originating lines and a greater number of message target lines in comparison to the routing system 5 of FIG. 1. For example, in a second embodiment of the invention, a large-scale routing system has 1024 message originating lines and 1024 message target lines. Each router element of the second embodiment has sixty-four input lines and sixteen output wire groups, each output wire group having four output lines. Similar to the routing system 5 of FIG. 1, the large-scale routing system also has three stages. Each stage comprises sixteen router elements.

Figure 9:
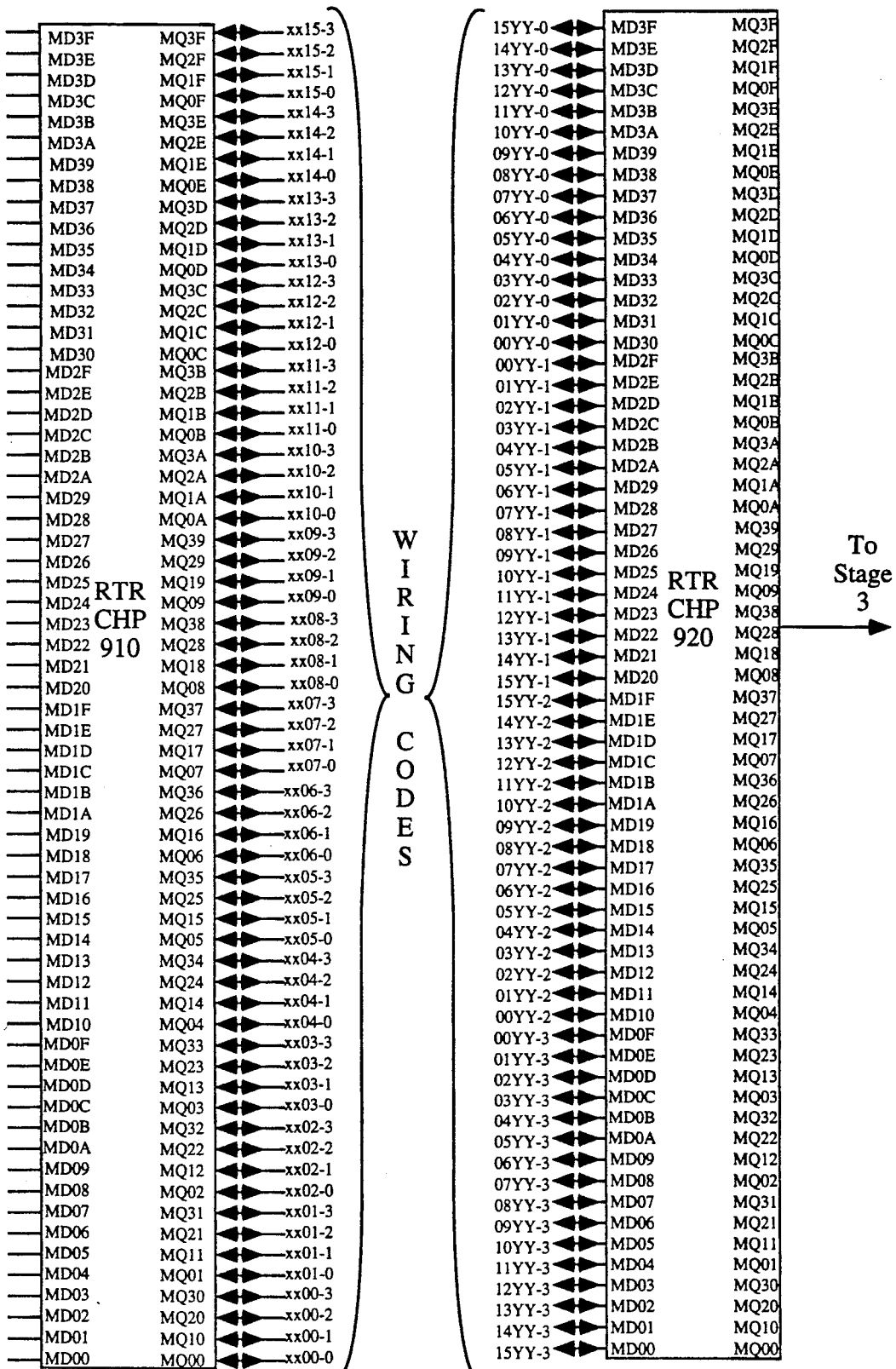
FIG. 9 shows router elements of a large-scale routing system and wiring codes for determining a wiring network between stages 1 and 2 of the large-scale routing system having a "twist", a "splay", and a "tweak."

FIG. 9 shows an arbitrary router element 910 within stage 1 and an arbitrary router element 920 within stage 2 of the large scale routing system. The input lines of each router element 910 and 920 are designated from MD00 to MD3F (hexadecimal), wherein lower numbered input lines have a higher priority in comparison to higher numbered input lines. The output lines are labeled with designators from MQ00 to MQ3F, wherein the priority of each output line within an output wire group is numbered from 0 to 3 (0 being highest priority and 3 being lowest priority) and is indicated by the third character of the output line designator. The output wire group of each output line is numbered from 0 to F (hexadecimal) and is given by the fourth character of the output line designator. For example, output line MQ0C is within output wire group C and has the highest priority (0) within that output wire group. Similarly, output line MQ31 is within output wire group 1 and has the second to lowest priority (3) within that output wire group.

A specific wiring pattern for the large-scale routing system which includes the "twist", the "splay", and the "tweak" is represented by the wiring codes within FIG. 9. The connection of wires between stage 1 router elements and stage 2 router elements is determined by replacing the variables XX and YY with a specific router element number ranging from 00 to 15, depending upon which of the sixteen router elements within each stage is being considered. The wiring code may be utilized to determine the specific wiring pattern by first setting the variable XX to 00 which represents a first of the sixteen router elements in stage 1 and by setting the variable YY to 00 which represents a first of the sixteen router elements in stage 2. Any pair of lines of the first router elements of stages 1 and 2 having the same resulting wiring code (a matching code) are consequently interconnected. The variable YY is next set to 01 representing a second router element of stage 2 (while XX remains set to 00), and each pair of lines from the first router element in stage 1 to the second router element in stage 2 having matching wiring codes are interconnected. This process is continued until YY is incremented to 15 (representing the fifteenth router element of stage 2) and lines having matching wiring codes are again interconnected. The variable XX is next set to 01 (representing a second of the router elements in stage 1) and YY is set to 00. Lines having matching wiring codes are interconnected, and the process is repeated until the variable XX is incremented to 15. Thus, each stage 1 router element is separately paired with each stage 2 router element, and corresponding lines having matching wiring codes are interconnected.

Emulation of the large-scale routing system (having 1024 input lines) indicates that when 16,384 messages (16 per message originating line) are delivered to random addresses, the connection scheme as shown in FIG. 3 takes an average of 56 message cycles (transfer cycles) to deliver all the messages. Using a connection scheme having a twist and a splay as shown in FIG. 5 according to the invention, the average number of message cycles is 47 cycles, an improvement of 16%. These averages are based upon twenty emulations of each wiring scheme, as shown in Tables I and II below. Each emulation test number designates a separate test in which 16 random address requests are queued at each message originating line.

TABLE I (Routing System Using Wiring Network of FIG. 3)

| Emulation Test Number | Total Number of Messaging Cycles Required |
| --- | --- |
| 1 | 53 |
| 2 | 53 |
| 3 | 57 |
| 4 | 55 |
| 5 | 55 |
| 6 | 52 |
| 7 | 53 |
| 8 | 52 |
| 9 | 58 |
| 10 | 55 |
| 11 | 58 |
| 12 | 53 |
| 13 | 52 |
| 14 | 59 |
| 15 | 54 |
| 16 | 55 |
| 17 | 56 |
| 18 | 53 |
| 19 | 54 |
| 20 | 56 |
| | Average = 56 |

TABLE II (Routing System Using Wiring Network of FIG. 5)

| Emulation Test Number | Total Number of Messaging Cycles Required |
| --- | --- |
| 1 | 46 |
| 2 | 46 |
| 3 | 46 |
| 4 | 48 |
| 5 | 48 |
| 6 | 46 |
| 7 | 49 |
| 8 | 46 |
| 9 | 50 |
| 10 | 49 |
| 11 | 49 |
| 12 | 45 |
| 13 | 45 |
| 14 | 45 |
| 15 | 46 |
| 16 | 49 |
| 17 | 47 |
| 18 | 46 |
| 19 | 49 |
| 20 | 46 |
| | Average = 47 |

Emulation data, as shown in Table III below, shows the total number of messages delivered to the output of stage 3 after each messaging cycle for the large-scale routing system wired according to FIG. 3. The number of messages delivered through each stage after each messaging cycle is also shown.

TABLE III

| Messaging Cycle | Input lines with messages | Messages through Stage 1 | Messages through Stage 2 | Messages through Stage 3 | Total Messages Delivered |
| --- | --- | --- | --- | --- | --- |
| 1 | 1024 | 835 | 736 | 553 | 553 |
| 2 | 1024 | 811 | 702 | 513 | 1066 |
| 3 | 1024 | 804 | 682 | 505 | 1571 |
| 4 | 1024 | 799 | 686 | 513 | 2084 |
| 5 | 1024 | 783 | 666 | 483 | 2567 |
| 6 | 1024 | 782 | 667 | 494 | 3061 |
| 7 | 1024 | 783 | 662 | 484 | 3545 |
| 8 | 1024 | 786 | 669 | 509 | 4054 |
| 9 | 1024 | 786 | 665 | 501 | 4555 |
| 10 | 1024 | 758 | 645 | 478 | 5033 |
| 11 | 1024 | 754 | 643 | 474 | 5507 |
| 12 | 1024 | 767 | 651 | 484 | 5991 |
| 13 | 1024 | 766 | 644 | 470 | 6461 |
| 14 | 1024 | 760 | 641 | 474 | 6935 |
| 15 | 1024 | 761 | 629 | 478 | 7413 |
| 16 | 1024 | 749 | 622 | 458 | 7871 |
| 17 | 992 | 750 | 640 | 480 | 8351 |
| 18 | 953 | 730 | 632 | 477 | 8828 |
| 19 | 912 | 709 | 614 | 470 | 9298 |
| 20 | 882 | 695 | 608 | 455 | 9753 |
| 21 | 839 | 654 | 584 | 454 | 10207 |
| 22 | 817 | 644 | 576 | 424 | 10631 |
| 23 | 776 | 619 | 566 | 442 | 11073 |
| 24 | 725 | 586 | 540 | 415 | 11488 |
| 25 | 686 | 571 | 530 | 424 | 11912 |
| 26 | 636 | 532 | 491 | 388 | 12300 |
| 27 | 600 | 493 | 466 | 365 | 12665 |
| 28 | 556 | 464 | 435 | 352 | 13017 |
| 29 | 518 | 430 | 406 | 338 | 13355 |
| 30 | 469 | 392 | 384 | 319 | 13674 |
| 31 | 435 | 369 | 361 | 305 | 13979 |
| 32 | 404 | 346 | 341 | 292 | 14271 |
| 33 | 361 | 312 | 309 | 255 | 14526 |
| 34 | 323 | 280 | 274 | 235 | 14761 |
| 35 | 291 | 260 | 258 | 232 | 14993 |
| 36 | 261 | 235 | 235 | 203 | 15196 |
| 37 | 233 | 212 | 211 | 192 | 15388 |
| 38 | 205 | 195 | 195 | 176 | 15564 |
| 39 | 167 | 155 | 154 | 134 | 15698 |
| 40 | 147 | 134 | 133 | 122 | 15820 |
| 41 | 123 | 118 | 118 | 114 | 15934 |
| 42 | 109 | 108 | 108 | 107 | 16041 |
| 43 | 85 | 83 | 83 | 81 | 16122 |
| 44 | 65 | 65 | 65 | 64 | 16186 |
| 45 | 56 | 56 | 56 | 56 | 16242 |
| 46 | 44 | 44 | 44 | 42 | 16284 |
| 47 | 37 | 37 | 37 | 36 | 16320 |
| 48 | 27 | 27 | 27 | 27 | 16347 |
| 49 | 18 | 18 | 18 | 18 | 16365 |
| 50 | 11 | 11 | 11 | 11 | 16376 |
| 51 | 5 | 5 | 5 | 5 | 16381 |
| 52 | 2 | 2 | 2 | 2 | 16383 |
| 53 | 1 | 1 | 1 | 1 | 16384 |

In contrast, Table IV below shows the total number of messages delivered to the output of stage 3 after each messaging cycle for the large-scale routing system wired according to FIG. 5. The number of messages delivered through each stage after each messaging cycle is also shown.

TABLE IV

| Messaging Cycle | Input lines with messages | Messages through Stage 1 | Messages through Stage 2 | Messages through Stage 3 | Total Messages Delivered |
|---|---|---|---|---|---|
| 1 | 1024 | 835 | 736 | 547 | 547 |
| 2 | 1024 | 815 | 702 | 512 | 1059 |
| 3 | 1024 | 821 | 692 | 488 | 1547 |
| 4 | 1024 | 810 | 682 | 507 | 2054 |
| 5 | 1024 | 807 | 689 | 523 | 2577 |
| 6 | 1024 | 804 | 691 | 513 | 3090 |
| 7 | 1024 | 799 | 683 | 497 | 3587 |
| 8 | 1024 | 789 | 665 | 479 | 4066 |
| 9 | 1024 | 795 | 679 | 504 | 4570 |
| 10 | 1024 | 794 | 674 | 496 | 5066 |
| 11 | 1024 | 810 | 685 | 520 | 5586 |
| 12 | 1024 | 804 | 692 | 519 | 6105 |
| 13 | 1024 | 797 | 679 | 493 | 6598 |
| 14 | 1024 | 792 | 662 | 486 | 7084 |
| 15 | 1024 | 799 | 684 | 512 | 7596 |
| 16 | 1024 | 802 | 688 | 511 | 8107 |
| 17 | 1024 | 776 | 667 | 496 | 8603 |
| 18 | 1023 | 778 | 680 | 493 | 9111 |
| 19 | 1018 | 791 | 691 | 481 | 9620 |
| 20 | 1001 | 779 | 678 | 465 | 10116 |
| 21 | 979 | 773 | 677 | 457 | 10609 |
| 22 | 955 | 753 | 646 | 448 | 11090 |
| 23 | 923 | 744 | 628 | 444 | 11572 |
| 24 | 870 | 714 | 623 | 465 | 12037 |
| 25 | 818 | 691 | 611 | 457 | 12494 |
| 26 | 755 | 669 | 596 | 448 | 12942 |
| 27 | 699 | 643 | 561 | 444 | 13386 |
| 28 | 632 | 588 | 515 | 407 | 13793 |
| 29 | 562 | 537 | 476 | 382 | 14175 |
| 30 | 506 | 484 | 446 | 354 | 14529 |
| 31 | 440 | 420 | 401 | 319 | 14848 |
| 32 | 390 | 379 | 368 | 309 | 15157 |
| 33 | 330 | 327 | 318 | 273 | 15430 |
| 34 | 272 | 270 | 266 | 230 | 15660 |
| 35 | 221 | 217 | 216 | 196 | 15856 |
| 36 | 164 | 164 | 163 | 148 | 16004 |
| 37 | 120 | 120 | 120 | 112 | 16116 |
| 38 | 100 | 100 | 100 | 96 | 16212 |
| 39 | 74 | 74 | 74 | 69 | 16281 |
| 40 | 49 | 49 | 49 | 46 | 16327 |
| 41 | 27 | 27 | 27 | 27 | 16354 |
| 42 | 16 | 16 | 16 | 16 | 16370 |
| 43 | 8 | 8 | 8 | 8 | 16378 |
| 44 | 4 | 4 | 4 | 4 | 16382 |
| 45 | 1 | 1 | 1 | 1 | 16383 |
| 46 | 1 | 1 | 1 | 1 | 16384 |

There are several modifications which may be made to the present invention. The present invention may be adapted to a routing network having any number of input lines, output lines, and output groups. Furthermore, a cluster of processing elements may be connected to and share the same input and output lines of the routing network.

Figure 10:
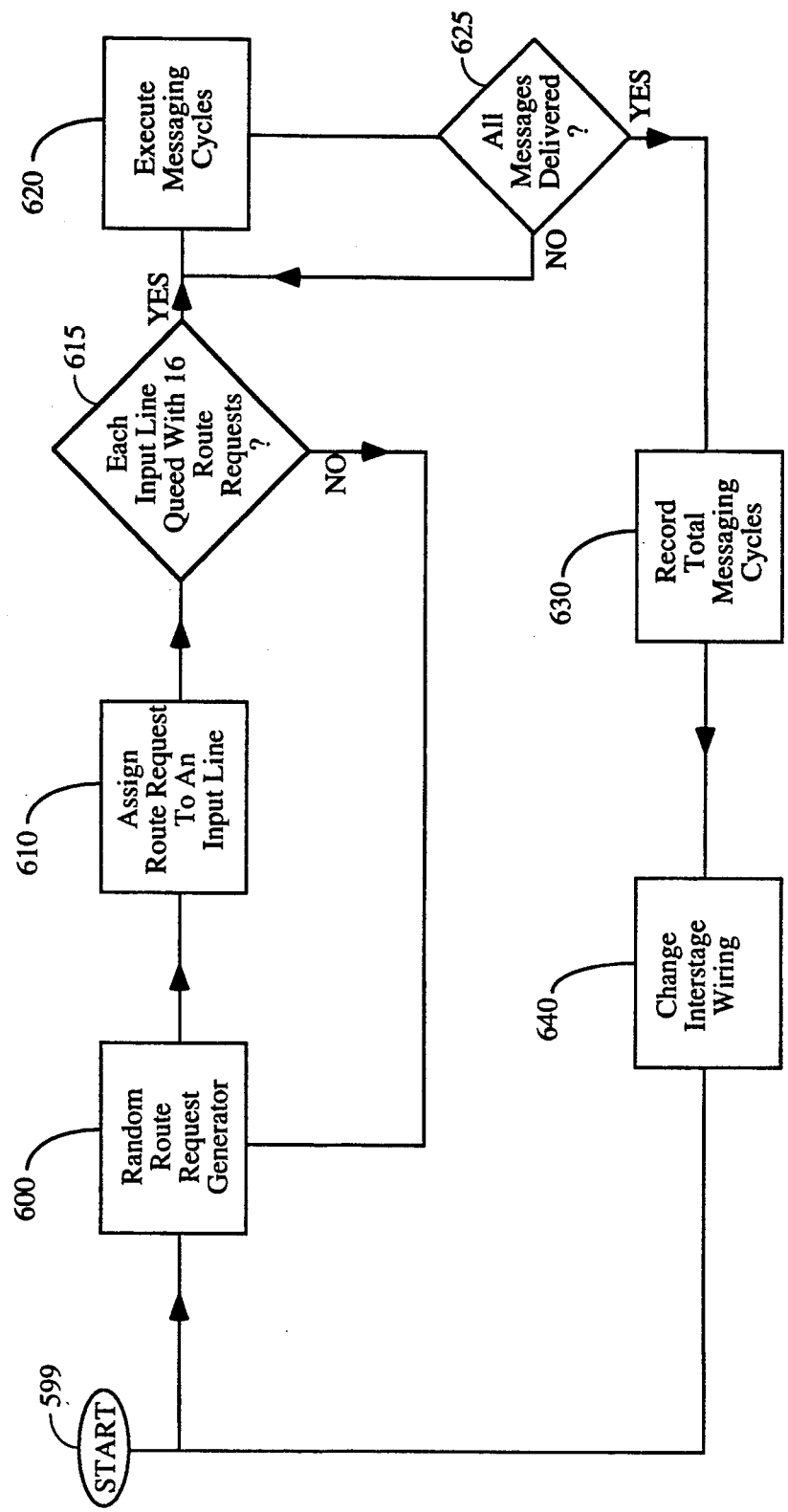
FIG. 10 shows a block diagram of a testing sequence for determining an optimal wiring pattern of the router network.

A router simulator may be used to determine an optimal set of twists, splays, and tweaks to the wiring pattern for a random communication pattern or for a particular communication pattern. A router simulator may be programmed within a general purpose computer. FIG. 10 shows a block diagram (including blocks 599, 600, 610, 615, 620, 625, 630 and 640 ) of a testing sequence for determining the optimal wiring pattern of a router network for a random communication pattern. A random number generator generates random route requests as shown in block 600. The random route requests are assigned to an input line in block 610 until each input line is queued with sixteen route requests. Messaging cycles are next executed as shown in block 620 until all messages have been delivered. Finally, the total messaging cycles required is recorded (Block 630). The interstage wiring of the router simulator is modified in block 640 and the process is repeated. The optimal wiring pattern for random route requests is that which requires the fewest average number of messaging cycles to deliver all the messages.

The embodiments described above are intended to be exemplary and not limiting. In view of the above disclosure, modifications will be obvious to one of ordinary skill in the art without departing from the scope of the invention.

I claim:

1. A network for interconnecting a plurality of router elements to thereby form a routing system within a parallel computer system for routing data from source processing elements to destination processing elements, each of said router elements including a plurality of input lines and a plurality of output groups, each of said output groups having a plurality of output lines, wherein said input lines and said output lines of each of said router elements are fixedly prioritized by position, and wherein each of said router elements directs data from said input lines to said output lines according to an address signal which selects an output group such that is a first set of data on a higher priority input line is directed to a selected output group and a second set of data on a lower priority input line is also directed to said selected output group then said first set of data is directed to a higher priority output line of said selected output group and said second set of data is directed to a lower priority output line of said selected output group, said network comprising:

a first connecting means connected to a first output line from a first of said router elements in a first stage of router elements and to a first input line of a second of said router elements in a second stage of router elements;

a second connecting means connected to a second output line from said first of said router elements and to a second input line of said second of said router elements, wherein said first output line and said second output line are included within a first output group of said first of said router elements, wherein said first output line has a fixed higher priority position than said second output line, and wherein said first input line of said second of said router elements has a fixed lower priority position than said second input line of said second of said router elements;

a third connecting means connected to a third output line from said first of said router elements and to a third input line of said second of said router elements;

a fourth connecting means connected to a fourth output line from said first of said router elements and to a fourth input line of said second of said router elements, wherein said third output line and said fourth output line are included within said first output group of said first of said router elements, and said third output line has a lower priority than said second output line and a higher priority than said fourth output line, and said third input line of said second of said router elements has a lower priority than said fourth input line of said second of said router elements and a higher priority than said second input line of said second of said router elements;

a fifth connecting means connected to a fifth output line from a third of said router elements in said first stage of router elements and to a fifth input line of said second of said router elements;